US012035085B1

(12) United States Patent
Li et al.

(10) Patent No.: US 12,035,085 B1
(45) Date of Patent: *Jul. 9, 2024

(54) MULTI-PERIOD UPGRADE SCHEDULING METHOD BASED ON ULTRA-LOW LOSS OPTICAL FIBER

(71) Applicant: SOOCHOW UNIVERSITY, Suzhou (CN)

(72) Inventors: Yongcheng Li, Suzhou (CN); Jingjing Bai, Suzhou (CN); Gangxiang Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/912,471

(22) PCT Filed: Jul. 19, 2021

(86) PCT No.: PCT/CN2021/107024
§ 371 (c)(1),
(2) Date: Sep. 16, 2022

(87) PCT Pub. No.: WO2023/283968
PCT Pub. Date: Jan. 19, 2023

(30) Foreign Application Priority Data

Jul. 12, 2021 (CN) .......................... 202110786537.5

(51) Int. Cl.
*H04B 10/25* (2013.01)
*H04Q 11/00* (2006.01)

(52) U.S. Cl.
CPC ......... *H04Q 11/0067* (2013.01); *H04B 10/25* (2013.01); *H04Q 2011/0064* (2013.01); *H04Q 2011/0086* (2013.01)

(58) Field of Classification Search
CPC .......................... H04Q 11/0062; H04B 10/25
See application file for complete search history.

(56) References Cited

U.S. PATENT DOCUMENTS

2017/0003444 A1   1/2017   Ouh et al.
2019/0207677 A1*  7/2019   Shen ................. H04B 10/0773

FOREIGN PATENT DOCUMENTS

CN   106487685 A   3/2017
CN   108199881 A   6/2018

OTHER PUBLICATIONS

Li et al., "Efficient Multi-Stage Deployment of Ultra-Low Loss Fibers in Elastic Optical Networks", IEEE, Feb. 2020 (Year: 2020).*

(Continued)

*Primary Examiner* — Shi K Li
(74) *Attorney, Agent, or Firm* — SZDC Law PC (57) ABSTRACT

The invention provides a multi-period upgrade scheduling method, including: setting a quantity of periods for optical fiber upgrade, and determining a maximum optical fiber length of upgrade in each period; randomly generating an upgrade scheduling sequence, and calculating a total upgrade gain of the sequence; randomly generating a new upgrade scheduling sequence, and calculating a total upgrade gain of the current sequence; calculating a difference obtained by subtracting a gain of the previous sequence from a gain of the current sequence, if the difference is greater than or equal to 0, replacing the previous upgrade scheduling sequence with the current upgrade scheduling sequence, and if the difference is less than 0, accepting the current upgrade scheduling sequence according to a probability value formula; and performing multiple iterations, and if a new upgrade scheduling sequence has not been updated when a set quantity of iterations is reached, terminating iteration.

7 Claims, 8 Drawing Sheets

(56) References Cited

OTHER PUBLICATIONS

Liu et al., "Scheduling Strategy for Multi-Stage Ultra-Low Loss Fiber Deployment in an Elastic Optical Network", 20th ICOCN, IEEE, 2022 (Year: 2022).*

Yongcheng Li et al., "Strategies and Benefits of Deploying Ultralow-Loss Fiber Links in an Elastic Optical Network" J. Opt. Commun. Netw. vol. 11, No. 5, pp. 238-249 (May 31, 2019).

Walid Ben-Ameur, "Computing the Initial Temperature of Simulated Annealing" Computational Optimization and Applications, vol. 29, No. 3, pp. 369-385 (Dec. 31, 2004).

Yongcheng Li, et al., "Efficient Multi-Stage Deployment of Ultra-Low Loss Fibers in Elastic Optical Networks" Journal of Lightwave Technology, vol. 38, No. 14, pp. 3542-3552 (Jul. 15, 2020).

* cited by examiner

MULTI-PERIOD UPGRADE SCHEDULING METHOD BASED ON ULTRA-LOW LOSS OPTICAL FIBER

This application is the National Stage Application of PCT/CN2021/107024, filed on Jul. 19, 2021, which claims priority to Chinese Patent Application No. 202110786537.5, filed on Jul. 12, 2021, which is incorporated by reference for all purposes as if fully set forth herein.

FIELD OF THE INVENTION

The present invention relates to the field of optical fiber scheduling technologies, and in particular, to a multi-period upgrade scheduling method based on an ultra-low loss optical fiber.

DESCRIPTION OF THE RELATED ART

With the rapid development of Internet technology, new Internet services are gradually emerging, which leads to an explosive increase in bandwidth demand for network services and poses a huge challenge to a backbone network with an optical network as the main component. Therefore, it is necessary to consider how to further enhance the transmission bandwidth and efficiency of backbone optical networks. Meanwhile, the maturity of optical channel higher-order modulation technology has laid the foundation for the implementation of 400G or even 1T optical channel services in the future. However, due to the widespread use of conventional standard single-mode fibers (that is, G.652 fibers) in existing networks, the repeaterless transmission distance of optical channels decreases as the transmission speed increases and cannot meet the future demand for ultra-high speed and ultra-long distance optical transmission. Therefore, it is necessary to consider the use of new optical fibers with higher performance.

As a new type of optical fiber with lower loss, an ultra-low loss optical fiber can greatly increase the transmission distance of 400G or even 1T high-speed optical channels, and is considered as a preferred optical fiber for implementing ultra-high-speed transmission. At present, there is a large amount of literature on the preparation of ultra-low loss optical fibers, which have reduced the loss of ultra-low loss optical fibers below 0.170 dB/km. In recent years, major operators in China have started to deploy ULL fibers in optical networks. However, there is only a few research on the application of ultra-low loss optical fibers, especially there is almost no research on the problem of multi-period upgrade and scheduling for ultra-low loss optical fibers.

SUMMARY OF THE INVENTION

A technical problem to be resolved by the present invention is to provide a high-precision, low-loss multi-period upgrade scheduling method based on an ultra-low loss optical fiber.

To resolve the foregoing problem, the present invention provides a multi-period upgrade scheduling method based on an ultra-low loss optical fiber, including the following steps:
   A. setting a quantity of periods for optical fiber upgrade, and determining a maximum optical fiber length of upgrade in each period;
   B. randomly generating an upgrade scheduling sequence, and calculating a total upgrade gain of the sequence;
   C. randomly generating a new upgrade scheduling sequence again, and calculating a total upgrade gain of the current sequence;
   D. calculating a difference obtained by subtracting a gain of the previous sequence from a gain of the current sequence, if the difference is greater than or equal to 0, replacing the previous upgrade scheduling sequence with the current upgrade scheduling sequence, if the difference is less than 0, accepting the current upgrade scheduling sequence according to a probability value formula, that is, randomly generating a number ranging from 0 to 1, if the number is greater than a probability value, replacing the previous upgrade scheduling sequence with the current upgrade scheduling sequence, and if the number is less than or equal to the probability value, keeping the previous upgrade scheduling sequence, and returning to step C; and
   E. performing multiple iterations, and if a new upgrade scheduling sequence has not been updated when a set quantity of iterations is reached, terminating iteration.

As a further improvement to the present invention, the probability value formula is:

$$P = \begin{cases} 1, & E(n+1) > E(n) \\ e^{(E(n+1)-E(n))/t}, & E(n+1) < E(n) \end{cases},$$

where E(n+1) is a gain value corresponding to a new solution, E(n) is a gain value corresponding to an initial solution, and t is a temperature in a current state.

As a further improvement to the present invention, a method for calculating the total upgrade gains in steps B and C includes the following steps:
   S1. searching for a path from a source node to a destination node for a request for a service;
   S2. calculating an OSNR of the service and selecting an appropriate optical signal modulation format for the service;
   S3. allocating a spectrum resource to the path;
   S4. generating an optical fiber link with a length not exceeding 30% of an overall length of an optical network;
   S5. performing ULL optical fiber replacement;
   S6. calculating a time t and an FS in a replacement process, and introducing the time t and the FS into a gain calculation formula to calculate a gain after a replacement of the period; and
   S7. determining whether period division is completed, and if yes, calculating a total gain generated from the replacement of the entire optical network, or otherwise returning to step S4.

As a further improvement to the present invention, the gain calculation formula is:

$$GS = \Sigma_{k \geq 1}(H_k - C_k) \cdot T + \Sigma_{k \geq 1}(C_k - M_k) \cdot (T - T_k),$$

where k is a period indicator of a replacement of an optical fiber link; $H_k$ is a maximum quantity of FSs used in the period in a case that a ULL optical fiber deployment is not used; $C_K$ is a maximum use quantity of FSs when a period starts, where a network traffic demand in the period increases; $M_K$ is a maximum quantity of FSs used after allocation of network spectrum resources is optimized again after a ULL optical fiber deployment is completed in this period; $C_K - M_K$ is a decrease quantity of FSs after spectrum resources in this period are optimized again; T is a time that elapses between two adjacent periods of a ULL optical fiber deployment, and is defined as a time from start of a current deployment period to start of a next period; $T_K$ is a time consumed to deploy all ULL optical fibers in the period; and $G_S$ is a total gain obtained from an entire deployment process through calculation when a ULL optical fiber deployment is used in all links.

As a further improvement to the present invention, a plurality of periods are used.

As a further improvement to the present invention, three periods are used, neither of lengths of an optical fiber link in two previous periods exceeds 30% of a total length, and the remaining optical fiber link is placed in an optical fiber link of the third period.

As a further improvement to the present invention, the randomly generating a new upgrade scheduling sequence again in step C includes:

C1. randomly generating an upgrade scheduling sequence; and

C2. determining whether the current sequence is the same as a previous scheduling sequence, if yes, returning to step C1, or otherwise, using the current sequence as a new upgrade scheduling sequence.

The beneficial effects of the invention are as follows:

In the multi-period upgrade scheduling method based on an ultra-low loss optical fiber in the present invention, optical networks are replaced according to periods, ULL optical fibers are scheduled and upgraded based on this, and iteration is performed repeatedly, so that a scheduling sequence with a maximum gain value may be found in all traversal processes, so that scheduling with the highest spectrum utilization can be obtained, thereby greatly saving spectrum resources.

The above description is only an overview of the technical solutions of the present invention. For a clearer understanding of the technical measure of the present invention and implementation according to the content of the specification, and to make the above and other objectives, features, and advantages of the present invention clearer and more comprehensible, detailed description is provided as follows with reference to preferred embodiments and the accompanying drawings.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Figure 1:
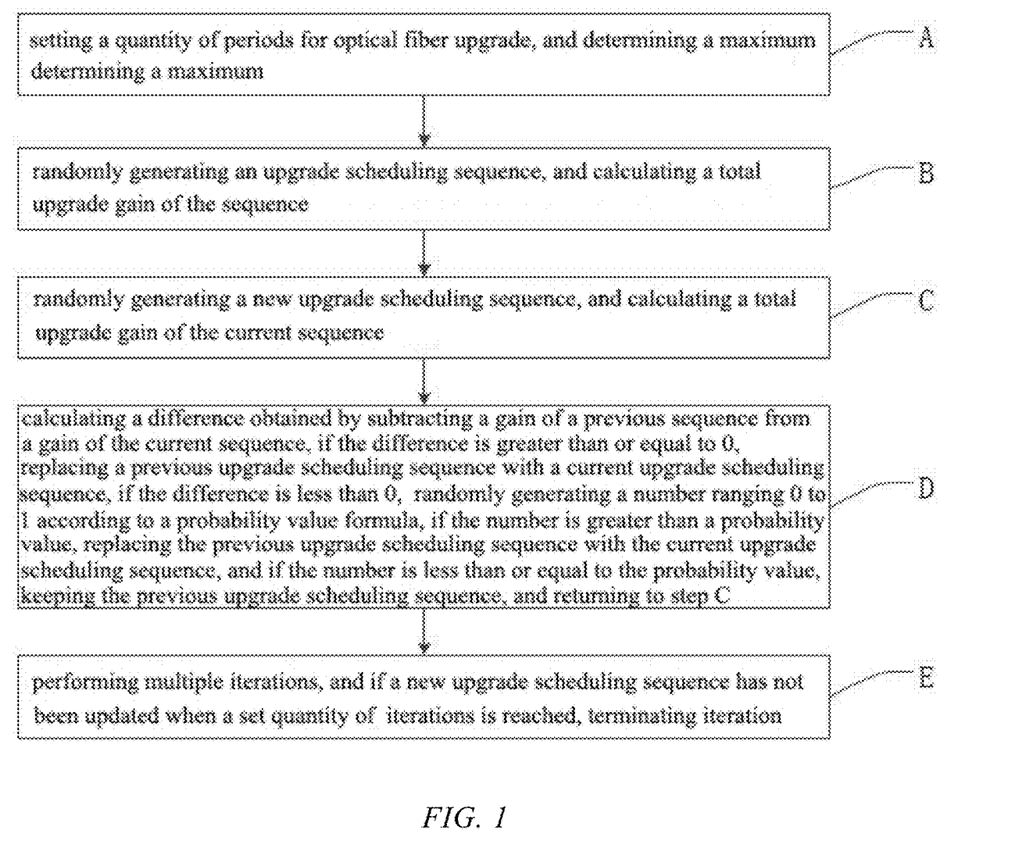
FIG. 1 is a flowchart of a multi-period upgrade scheduling method based on an ultra-low loss optical fiber according to a preferred embodiment of the present invention.

As shown in FIG. 1, a multi-period upgrade scheduling method based on an ultra-low loss optical fiber according to a preferred embodiment of the present invention includes the following steps.

A. Set a quantity of periods for optical fiber upgrade, and determine a maximum optical fiber length of upgrade in each period.

B. Randomly generate an upgrade scheduling sequence, and calculate a total upgrade gain of the sequence.

C. Randomly generate a new upgrade scheduling sequence again, and calculate a total upgrade gain of the current sequence.

D. Calculate a difference obtained by subtracting a gain of the previous sequence from a gain of the current sequence, if the difference is greater than or equal to 0, replace the current upgrade scheduling sequence with the previous upgrade scheduling sequence, if the difference is less than 0, accept the current upgrade scheduling sequence according to a probability value formula, that is, randomly generate a number ranging from 0 to 1, if the number is greater than a probability value, replace the current upgrade scheduling sequence with the previous upgrade scheduling sequence, and if the number is less than or equal to the probability value, keep the previous upgrade scheduling sequence, and returning to step C.

In the present invention, the probability value formula is:

$$P = \begin{cases} 1, E(n+1) > E(n) \\ e^{(E(n+1)-E(n))/t}, E(n+1) < E(n) \end{cases},$$

where E(n+1) is a gain value corresponding to a new solution, E(n) is a gain value corresponding to an initial solution, and t is a temperature in a current state. As shown in the formula, when the temperature is higher, a probability that a temperature drops upon one energy difference (that is, delt) is higher; and when the temperature is lower, a probability that a new solution is accepted and the temperature drops is lower. In the algorithm, an optimal solution of the two is always selected, and a second optimal solution is accepted with a particular probability.

E. Perform multiple iterations, and if a new upgrade scheduling sequence has not been updated when a set quantity of iterations is reached, terminate iteration.

Figure 2:
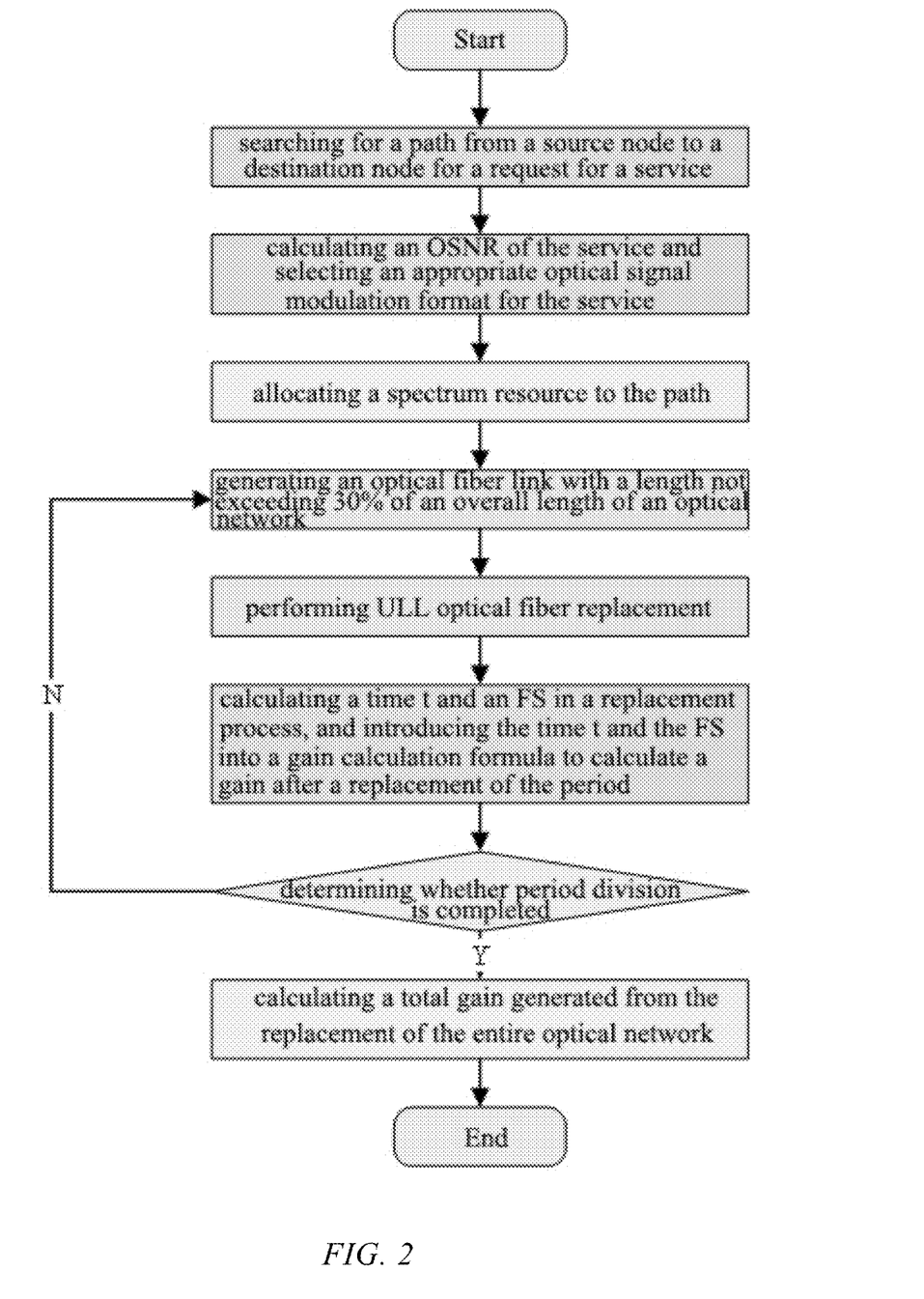
FIG. 2 shows a method for calculating a total gain according to a preferred embodiment of the present invention.

Optionally, as shown in FIG. 2, a method for calculating the total upgrade gains in steps B and C includes the following steps.

S1. Search for a path from a source node to a destination node for a request for a service.

S2. Calculate an OSNR of the service and selecting an appropriate optical signal modulation format for the service.

S3. Allocate a spectrum resource to the path.

S4. Generate an optical fiber link with a length not exceeding 30% of an overall length of an optical network.

S5. Perform ULL optical fiber replacement.

S6. Calculate a time t and an FS in a replacement process, and introduce the time t and the FS into a gain calculation formula to calculate a gain after a replacement of the period.

S7. Determine whether period division is completed, and if yes, calculate a total gain generated from the replacement of the entire optical network, or otherwise return to step S4.

The gain calculation formula is:

$$G_S = \Sigma_{k \geq 1}(H_k - C_k) \cdot T + \Sigma_{k \geq 1}(C_k - M_k) \cdot (T - T_k),$$

where k is a period indicator of a replacement of an optical fiber link; $H_k$ is a maximum quantity of FSs used in the period in a case that a ULL optical fiber deployment is not used; $C_K$ is a maximum use quantity of FSs when a period starts, where a network traffic demand in the period increases; $M_K$ is a maximum quantity of FSs used after allocation of network spectrum resources is optimized again after a ULL optical fiber deployment is completed in this period; $C_K - M_K$ is a decrease quantity of FSs after spectrum resources in this period are optimized again; T is a time that elapses between two adjacent periods of a ULL optical fiber deployment, and is defined as a time from start of a current deployment period to start of a next period; $T_K$ is a time consumed to deploy all ULL optical fibers in the period; and $G_S$ is a total gain obtained from an entire deployment process through calculation when a ULL optical fiber deployment is used in all links.

In an embodiment, three periods are used. Optionally, neither of lengths of an optical fiber link in two previous periods exceeds 30% of a total length, and the remaining optical fiber link is placed in an optical fiber link of the third period. After the allocation of each period is completed, the allocation is evaluated. The foregoing formula is used to calculate a gain. A sum of gain values of all periods is an overall again of current upgrade and scheduling.

Optionally, the randomly generating a new upgrade scheduling sequence again in step C includes:

C1. randomly generating an upgrade scheduling sequence; and

C2. determining whether the current sequence is the same as a previous scheduling sequence, if yes, returning to step C1, or otherwise, using the current sequence as a new upgrade scheduling sequence.

Figure 3:
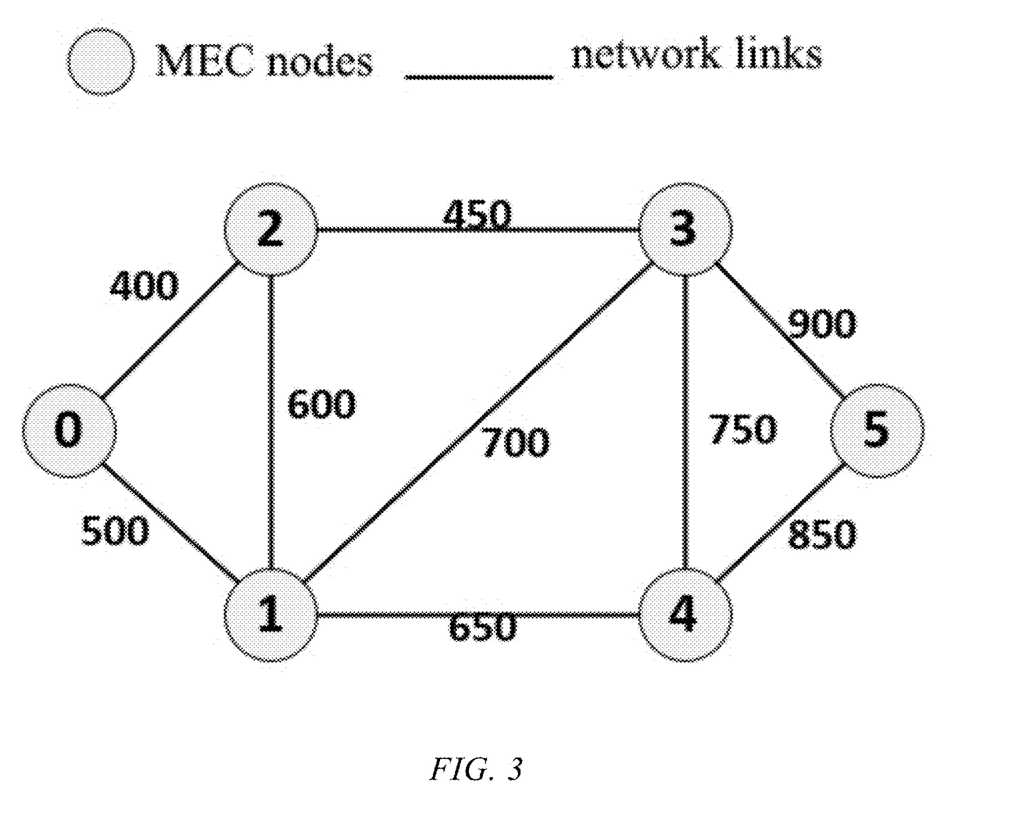
FIG. 3 is a schematic diagram of an NSFNET network according to a preferred embodiment of the present invention.

In an embodiment, to evaluate the performance of the proposed two distributed service scheduling policies, an n6s9 network with six MEC nodes and nine network links shown in FIG. 3 is used as a test network. A number on a link in the figure is a physical length (km) of the link.

For the simulation, some assumptions are made as follows:

A maximum available computing resource of each MEC server in the network is 1000 units.

An average computing resource required for each service is 400 units.

A quantity of services generated on each MEC node is known.

A total quantity of slots is set to 320 in the unit of t.

A quantity of distributed services on each node is randomly generated within a particular range.

In this embodiment, set reference groups are categorized according to a length of each link in an optical network, and are sorted in descending order of length. A new generated optical network is substituted into an evaluation function to calculate an evaluation indicator. The length of a bandwidth allocated to a service is changed to observe comparison between the algorithm and a reference group under different service amounts, as shown in the following table.

TABLE 1

| Scheduling sequence and gain of a reference group | | | |
|---|---|---|---|
| Allocated service amount | 300-800 | 300-1000 | 300-1200 |
| Gain of a reference group | 1500 | 2518 | 4663 |
| Gain of the algorithm | 3194 | 3802 | 5200 |
| Increased proportion | 112.9% | 51.0% | 11.5% |

Figure 4:
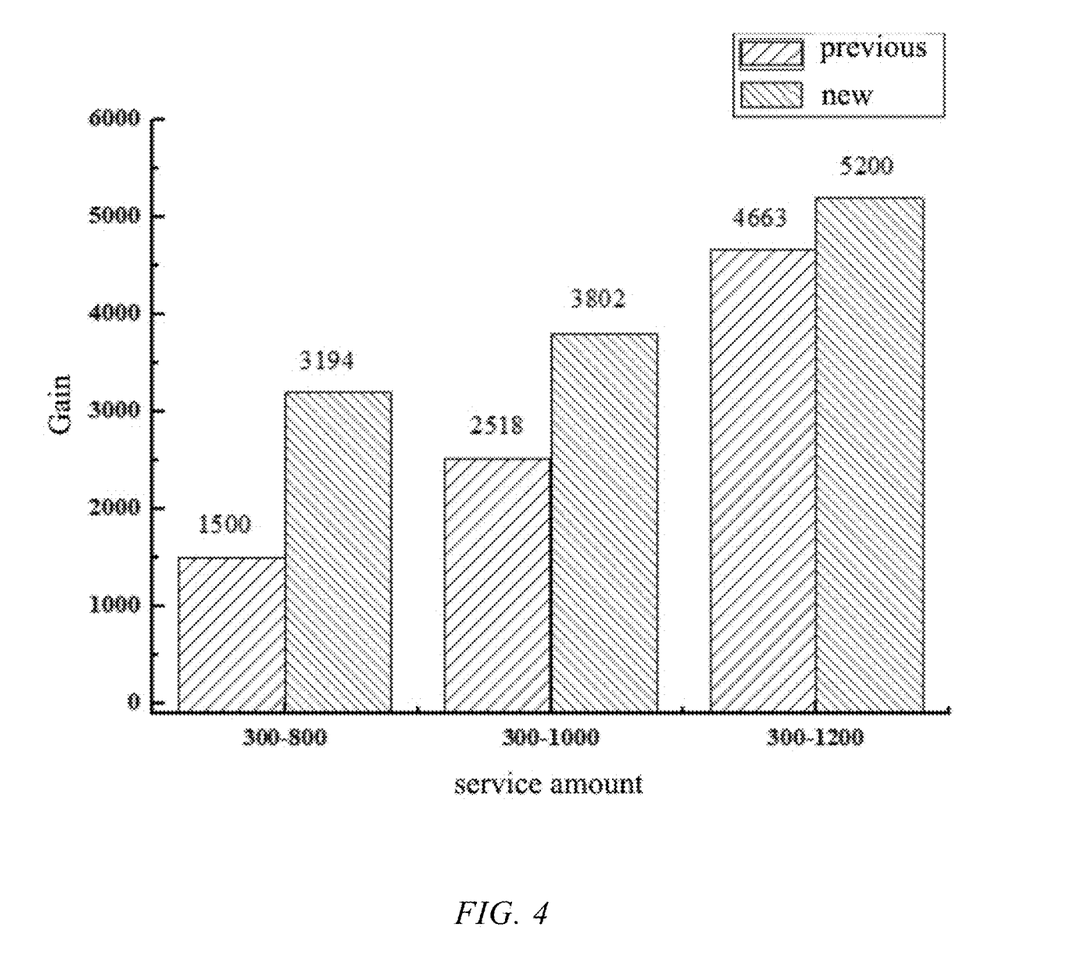
FIG. 4 is a diagram of an optical network gain generated by using a multi-period upgrade scheduling method based on an ultra-low loss optical fiber according to a preferred embodiment of the present invention.

To intuitively show the foregoing comparison results, a histogram shown in FIG. 4 is drawn. An X axis is a bandwidth allocation value, and a Y axis is a maximum gain value corresponding to proposed scheduling. As can be seen from the figure, when the service amount is small (300-800), a gain obtained by using the method is increased by 112.9% as compared with the reference group. The spectrum utilization is significantly increased. This proves that the method has high superiority. As the service amount gradually increases (300-1000, 300-1200), an increase rate in the gain is reduced, and when the service amount is higher, the increase rate is smaller. The reason is that after the service amount increases, a quantity of FSs occupied by a link is increased. Therefore, when the service amount is relatively small, the use of the algorithm achieves higher efficiency, and the design requirement is satisfied.

Next, for example, the service amount is 300-1000. The foregoing proposed manner is used for optimization, and optical fiber scheduling in two policies is proposed, as shown in Table 2.

TABLE 2

| Scheduling eventually proposed by using the algorithm and a reference group | | |
|---|---|---|
| Initial condition | N = 300, T0 = 2000, service amount: 300-1000 | |
| Stage | Reference group | The algorithm |
| 1 | N3-N5 N4-N5 N3-N4 | N3-N5 N0-N2 N1-N4 |
| 2 | N1-N3 N1-N4 N1-N2 | N0-N1 N2-N3 N1-N2 |
| 3 | N0-N1 N2-N3 N0-N2 | N4-N5 N1-N3 N3-N4 |
| Gain | 2518 | 3802 |

In the method, in addition to the optimization performance of the method, an optimization speed further needs to be considered during upgrade and scheduling optimization of an optical network to satisfy use requirements of users as much as possible. In a large-scale optical fiber network, it takes a long time to perform optimization for the network. Therefore, it needs to be considered what conditions in the algorithm affect the optimization speed.

There is an acceptance function in the algorithm. When delt>0, a new solution is accepted. When delt<0, a new solution is accepted with a particular probability. It can be known from the probability value formula that an initial temperature T0 affects an acceptance probability. To prove the impact of T0 on the optimization speed of the system, the initial condition in the present invention is set to be the same, and the value of the initial temperature T0 is changed to observe the optimization speed of the algorithm.

Theoretically, when the initial temperature T0 is higher, the value of the acceptance probability is larger. When the initial temperature T0 is lower, the value of the acceptance probability is smaller. That is, when the temperature is higher, it takes a longer time for a temperature drop process to reach stability. When the temperature is lower, it takes a shorter time to reach a stable state, and the algorithm is ended.

Figure 5:
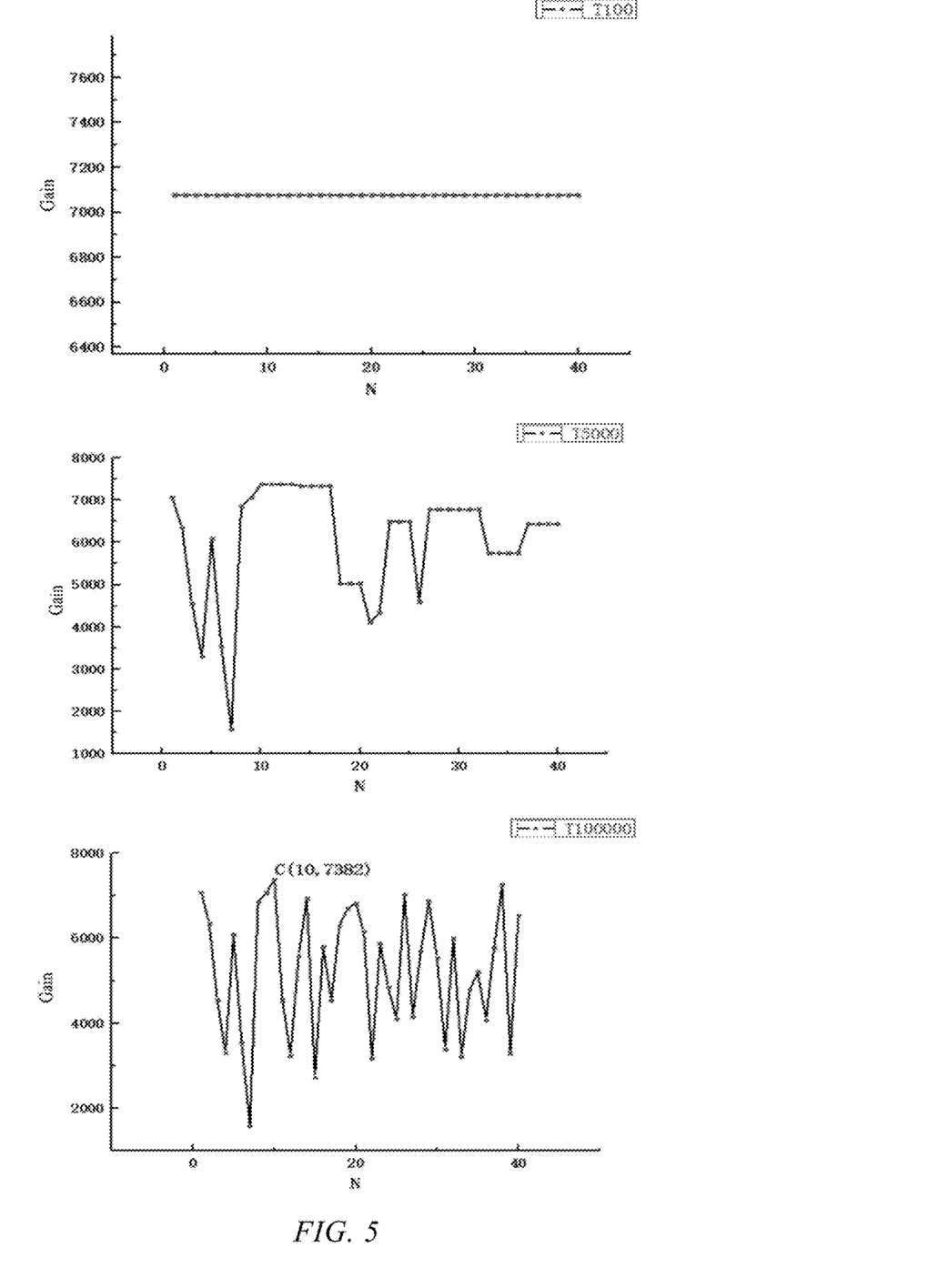
FIG. 5 is a curve graph of an optical network gain in an annealing process at different temperatures according to a preferred embodiment of the present invention.

Generally, a global optimal solution obtained through a simulated annealing algorithm should be a corresponding solution when the temperature tends to become stable in the entire temperature drop process. This requires that the entire iteration process is long enough, and the quantity of times of iteration is large enough. However, because an operation such as optimal fiber replacement in this topic takes a particular time, to intuitively see the impact of the initial temperature T0 on the algorithm, cases in which T0 is low enough and T0 is high enough need to be evaluated. To reduce the experimental time, in this example, it is set that the service allocation amount is 300-1300, and the quantity of times of iteration is N=40 remains unchanged. Changes in a gain curve in an annealing process at different temperatures are observed. In this embodiment, three cases T0=100, T0=5000, and T0=100000 are selected for test, as shown in FIG. 5.

As can be known, when T0 is changed, a change speed represented by the curve is also changed. When T0 is 100, a corresponding optimal value point is Gain=7077, and a temperature drop is ended in advance when local optimization is reached. When T0 is 5000, the range of N=40 is insufficient to find a global optimal solution. However, compared with the case in which T0=100000, the probability of the acceptance function is smaller. Therefore, it can be calculated that compared with the case in which T0=100000, when T0=5000, it takes a shorter time to reach a stable state.

In summary, the initial temperature T0 has particular impact on the annealing process. The impact is represented by the length of time required to reach an optimal state. The experimental results are consistent with the theory. Therefore, it is crucial to find a corresponding initial temperature when the optimization speed is the fastest and the global optimal solution can be accurately found.

The overall quantity N of times of iteration affects the quantity of times of traversal in the temperature drop process. When N is large enough, the optimal solution can be found as accurately as possible. To prove the impact of the quantity N of times of iteration on the optimization performance of the system, it is considered in this section to test optimization processes when the quantities N of times of iteration are different in the case that the service allocation amount is 300-1300 and other conditions are kept the same. The test results are shown in FIG. 7.

Figure 6:
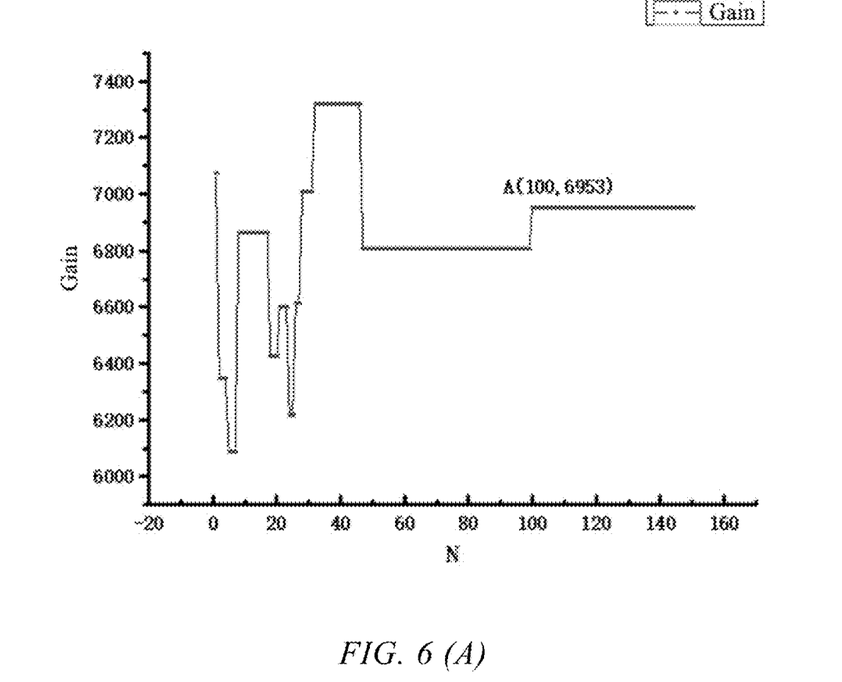
FIG. 6 is a curve graph of an optical network gain with different quantities of times of iteration according to a preferred embodiment of the present invention.

When N=150, a returned optimal value Gain eventually obtained in FIG. 6(a) is 6963. However, 6963 is not the optimal value in this traversal process. The reason is that when N is smaller, the system mistakes a local optimal value for a global optimal value. In this case, the algorithm has a large error. As shown in FIG. 6(b), when the iteration reaches N=160, Gain=7136. As shown in FIGS. 6(c) and 6(d), when the iteration reaches N=286, it is acquired that Gain=7681, and no new solution is accepted in all subsequent iteration. That is, the acceptance probability is 0. In this case, it is determined that Gain=7681 is the optimal value in the algorithm.

Figure 7:
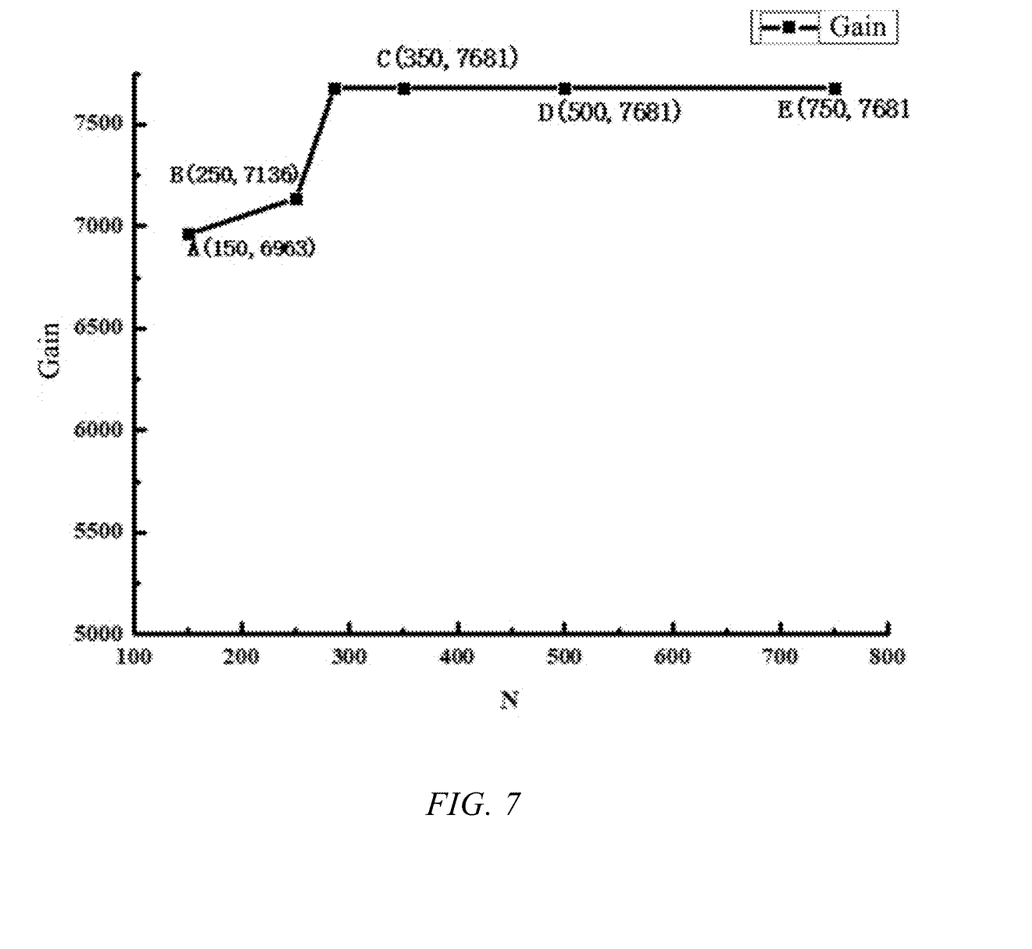
FIG. 7 is a curve graph of an optical network gain in the case of a sufficient quantity of times of iteration according to a preferred embodiment of the present invention.

To intuitively show the impact of the value of N on the optimization performance of the system, other conditions are kept unchanged, and a curve graph of optimal gains when N have different values is shown in FIG. 7.

As can be known from FIG. 7, when the quantity of times of iteration is small, the maximum gain of the optical network increases as the quantity of times of iteration increases. In this case, a local optimal value rather than a global optimal value is returned. When the quantity of times of iteration is large enough, the maximum gain value of the system is stably 7681, which is the global optical solution in this case.

In the multi-period upgrade scheduling method based on an ultra-low loss optical fiber in the present invention, optical networks are replaced according to periods, ULL optical fibers are scheduled and upgraded based on this, and iteration is performed repeatedly, so that a scheduling sequence with a maximum gain value may be found in all traversal processes, so that scheduling with the highest spectrum utilization can be obtained, thereby greatly saving spectrum resources.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A multi-period upgrade scheduling method based on an ultra-low loss optical fiber, comprising steps of:
    A. setting a quantity of periods for optical fiber upgrade, and determining a maximum optical fiber length of upgrade in each period;
    B. randomly generating an upgrade scheduling sequence, and calculating a total upgrade gain of the sequence;
    C. randomly generating a new upgrade scheduling sequence, and calculating a total upgrade gain of the current sequence;
    D. calculating a difference obtained by subtracting a gain of a previous sequence from a gain of the current sequence, if the difference is greater than or equal to 0, replacing a previous upgrade scheduling sequence with a current upgrade scheduling sequence, if the difference is less than 0, randomly generating a number ranging from 0 to 1, if the number is greater than a probability value calculated according to a probability value formula, replacing the previous upgrade scheduling sequence with the current upgrade scheduling sequence, and if the number is less than or equal to the probability value, keeping the previous upgrade scheduling sequence, and returning to step C; and
    E. performing multiple iterations, and if a new upgrade scheduling sequence has not been updated when a set quantity of iterations is reached, terminating iteration.

2. The multi-period upgrade scheduling method based on an ultra-low loss optical fiber according to claim 1, wherein the probability value formula is:

$$P = \begin{cases} 1, & E(n+1) > E(n) \\ e^{(E(n+1)-E(n))/t}, & E(n+1) < E(n) \end{cases},$$

wherein E(n+1) is a gain value corresponding to a new solution, E(n) is a gain value corresponding to an initial solution, and t is a temperature in a current state.

3. The multi-period upgrade scheduling method based on an ultra-low loss optical fiber according to claim 1, wherein a method for calculating the total upgrade gains in steps B and C comprises steps of:
- S1. searching for a path from a source node to a destination node for a request for a service;
- S2. calculating an OSNR of the service and selecting an appropriate optical signal modulation format for the service;
- S3. allocating a spectrum resource to the path;
- S4. generating an optical fiber link with a length not exceeding 30% of an overall length of an optical network;
- S5. performing ULL optical fiber replacement;
- S6. calculating a time t and an FS in a replacement process, and introducing the time t and the FS into a gain calculation formula to calculate a gain after a replacement of the period; and
- S7. determining whether period division is completed, and if yes, calculating a total gain generated from the replacement of the entire optical network, or otherwise returning to step S4.

4. The multi-period upgrade scheduling method based on an ultra-low loss optical fiber according to claim 3, wherein the gain calculation formula is:

$$GS=\Sigma_{k=1}(H_k-C_k)\cdot T+\Sigma_{k=1}(C_k-M_k)\cdot(T-T_k),$$

wherein k is a period indicator of a replacement of an optical fiber link; $H_k$ is a maximum quantity of FSs used in the period in a case that a ULL optical fiber deployment is not used; $C_K$ is a maximum use quantity of FSs when a period starts, wherein a network traffic demand in the period increases; $M_K$ is a maximum quantity of FSs used after allocation of network spectrum resources is optimized again after a ULL optical fiber deployment is completed in this period; $C_K-M_K$ is a decrease quantity of FSs after spectrum resources in this period are optimized again; T is a time that elapses between two adjacent periods of a ULL optical fiber deployment, and is defined as a time from start of a current deployment period to start of a next period; $T_K$ is a time consumed to deploy all ULL optical fibers in the period; and $G_S$ is a total gain obtained from an entire deployment process through calculation when a ULL optical fiber deployment is used in all links.

5. The multi-period upgrade scheduling method based on an ultra-low loss optical fiber according to claim 1, wherein a plurality of periods are used.

6. The multi-period upgrade scheduling method based on an ultra-low loss optical fiber according to claim 5, wherein three periods are used, neither of lengths of optical fiber links in two previous periods exceeds 30% of a total length, and the remaining optical fiber link is placed in an optical fiber link of the third period.

7. The multi-period upgrade scheduling method based on an ultra-low loss optical fiber according to claim 1, wherein randomly generating a new upgrade scheduling sequence again in step C comprises:
- C1. randomly generating an upgrade scheduling sequence; and
- C2. determining whether the current sequence is the same as a previous scheduling sequence, if yes, returning to step C1, or otherwise, using the current sequence as a new upgrade scheduling sequence.

* * * * *